(12) United States Patent
Chen

(10) Patent No.: US 7,513,634 B2
(45) Date of Patent: Apr. 7, 2009

(54) STRUCTURE OF PLANAR ILLUMINATOR

(75) Inventor: Cheng-Huan Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 11/751,240

(22) Filed: May 21, 2007

(65) Prior Publication Data

US 2008/0291693 A1   Nov. 27, 2008

(51) Int. Cl.
*G09F 13/04* (2006.01)
(52) U.S. Cl. .................. 362/97; 362/248; 362/290; 362/292; 362/342; 349/66
(58) Field of Classification Search .............. 362/97, 362/223, 248, 260, 290, 292, 342; 349/66, 349/70
See application file for complete search history.

(56) References Cited

U.S. PATENT DOCUMENTS 6,886,962 B2 * 5/2005 Suehiro ...................... 362/248

* cited by examiner

*Primary Examiner*—Stephen F Husar
(74) *Attorney, Agent, or Firm*—Rosenberg, Klein & Lee

(57) ABSTRACT

A structure of a backlight module, which includes: a light source frame, including: a top plate having a plurality of slits; a bottom plate arranged apart from the top plate; and at least two edge plates arranged oppositely, wherein each of the edge plates has a top end and a bottom end, and both of the bottom ends are separately connected with the bottom plate; wherein the inner surfaces of the top plate, the bottom plate and the edge plates form a reflective cavity; and at least one light source arranged in the reflective cavity. There are several advantages of the backlight module according to the present invention, which includes: 1. the required uniformity and brightness of the backlight module are achieved; 2. its weight is largely reduced; and 3. it can be tiled up to form a large-area backlight module for a large size display.

16 Claims, 4 Drawing Sheets

STRUCTURE OF PLANAR ILLUMINATOR

BACKGROUND OF THE INVENTION

1. Field of the Invention

The present invention relates to a planar illuminator, and more particularly, to a backlight module with a light source frame having a hollow reflective cavity.

2. Description of the Prior Art

The Liquid Crystal Display (LCD) is the most popular Flat Panel Display (FPD) recently. It has many benefits such as low power consumption, thin shape, light weight, and low driving voltage, etc. Therefore, it is widely applied for many electronic apparatuses, such as the notebook computer, the laptop computer and the television.

Because LCD is not self-illuminated, it needs a backlight module to provide the light source for the image display. Conventionally, the backlight module can be categorized into two types, namely the direct-illumination type and the edge-illumination type. The edge-illumination backlight module is mostly used for the small and medium size LCD, which uses the Cold Cathode Fluorescent Lamp (CCFL) or the Light Emitting Diode (LED) as the light source located at the edge of the backlight module.

FIG. 1 is a cross-sectional schematic diagram of the structure of a conventional edge-illumination backlight module 10. An edge-illumination backlight module 10 is located beneath a LCD panel 20. The edge-illumination backlight module 10 includes: a light source 12; a solid light guide 14; a plurality of optical films 18; and a reflective plate 16. The light emitted from the light source 12 enters into a side surface of the light guide 14, then it is partially guided owing to the internal reflection by the microstructure 142 of the bottom surface 144 of the light guide 14 and partially leaked out from the top surface 146 of the light guide 14, and then penetrates through the optical films 18 to serve as the illumination light for the LCD panel 20.

However, the solid light guide 14 with the microstructure 142 is complex and costly. Furthermore, its weight is heavy such that it is not suitable to be tiled up for the large size display applications.

SUMMARY OF THE INVENTION

In order to solve the aforementioned problems, one object of the present invention is to provide a planar illuminator with a light source frame having a hollow reflective cavity. Accordingly, the structure of the planar illuminator of the present invention is simple and easy to manufacture, thus it is cost effective and suitable for mass production.

One object of the present invention is to provide a planar illuminator with a light source frame having a hollow reflective cavity, which may arrange tilted plates and reflective coatings to increase the number of reflections and the reflectivity, or may include optical films to increase the uniformity and brightness before the light illuminates onto the image panel. Therefore, the uniformity and the quality of the illumination light output from the planar illuminator according to the present invention are effectively promoted.

One object of the present invention is to provide a planar illuminator with a light source frame having a hollow reflective cavity, the weight of the planar illuminator is light. Therefore, it is suitable to be tiled up to form a large-area backlight module for a large size display.

Accordingly, there are several advantages of the planar illuminator according to the present invention which includes: 1. the required uniformity and brightness of the planar illuminator are achieved; 2. its weight is largely reduced; and 3. it can be tiled up to form a large-area backlight module for a large size display.

To achieve the above-mentioned objects, one embodiment of the present invention is to provide a structure of a planar illuminator, including: a light source frame, including: a top plate having a plurality of slits; a bottom plate arranged apart from the top plate; and at least two edge plates arranged oppositely, wherein each of the edge plates has a top end and a bottom end, and both of the bottom ends are separately connected with the bottom plate; wherein the inner surfaces of the top plate, the bottom plate and the edge plates form a reflective cavity; and at least one light source arranged in the reflective cavity.

Other objects, technical contents, features and advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

The detailed explanation of the present invention is described as following. The described preferred embodiments are presented for purposes of illustrations and description, and they are not intended to limit the scope of the present invention.

Figure 1:
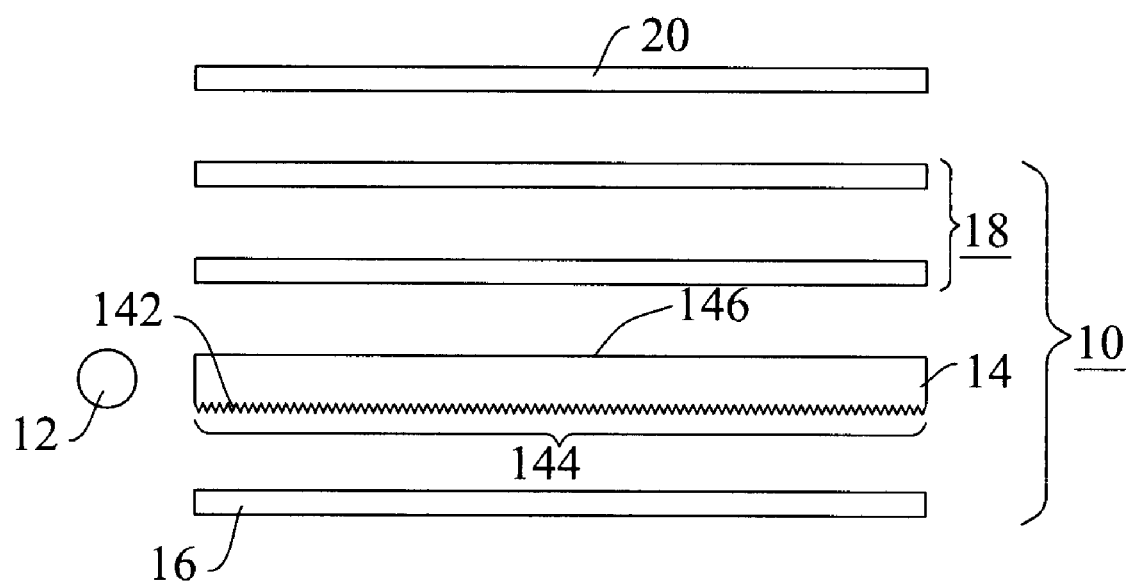
FIG. 1 is a cross-sectional schematic diagram of the structure of a conventional edge-illumination planar illuminator.
Figure 2A:
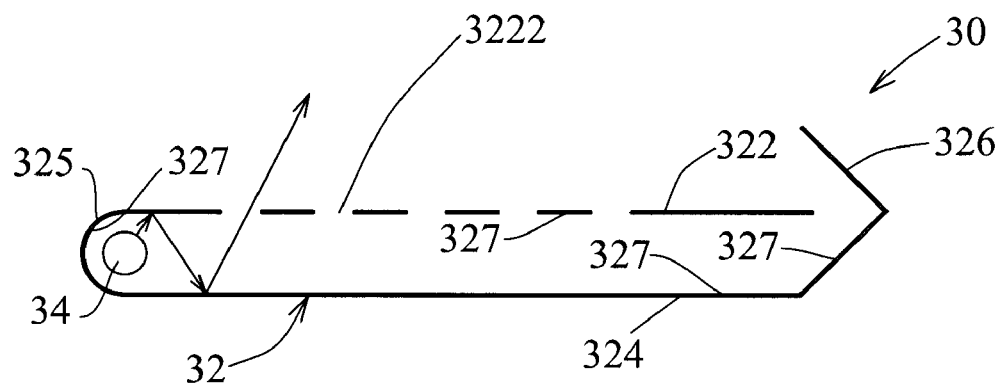
FIG. 2A and FIG. 2B are the side-view and solid schematic diagrams for the structure of a planar illuminator according to one embodiment of the present invention.
Figure 2B:
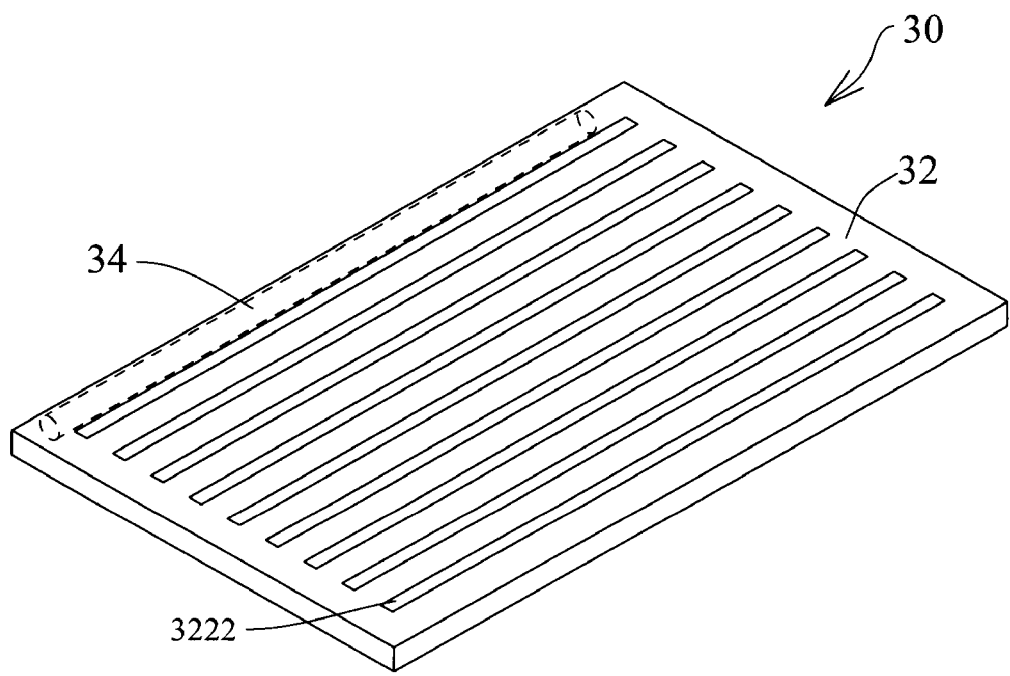

Firstly, please refer to FIG. 2A and FIG. 2B, which are the side-view and solid schematic diagrams for the structure of the planar illuminator 30 according to one embodiment of the present invention. A planar illuminator 30 includes a light source frame 32 and a light source 34. The light source frame 32 includes: a top plate 322 having a plurality of slits 3222; a bottom plate 324 arranged apart from the top plate 322; and two edge plates 325, 326 arranged oppositely, wherein each of the edge plates 325, 326 has a top end and a bottom end, and both of the bottom ends are separately connected with the bottom plate 324, wherein the inner surfaces of the top plate, the bottom plate and the edge plates form a reflective cavity. The light source 34 is arranged in the reflective cavity. The emitted light from the light source 34 impinges on the inner surface of the light source frame 32 and then is reflected, and the reflection process repeatedly proceeds to propagate the light down the reflective cavity of the light source frame 32. Some light is leaked out of the light source frame 32 via the slits 3222 to provide the illumination light for an image panel, such as a LCD panel (not shown in the figure).

Accordingly, one feature of the present invention is that the structure of the light source frame of the planar illuminator, for example a backlight module for an image panel, has a light source frame with a hollow reflective cavity. Therefore, the structure of the planar illuminator of the present invention is simple and easy to manufacture, thus it is cost effective and suitable for mass production.

Please continue to refer FIG. 2A, in one embodiment, the inner surface of the reflective cavity of the light source frame 32 may have a reflective coating 327 to increase the reflectivity and the guiding ability.

Continuing the above description, in one embodiment, the light source frame 32 may be a one-piece form. For example, the material of the light source frame 32 is metal, and it may be made by a method of sheet metal fabrication, a method of pressing and stamping or a method of punching and bending. Additionally, the material of the light source frame 32 may also be plastic or acrylic, and it may be made by a method of injection molding.

In one embodiment, the light source 34 may be Cold Cathode Fluorescent Lamp (CCFL), Light Emitting Diode (LED) or Laser Diode (LD).

Figure 3:
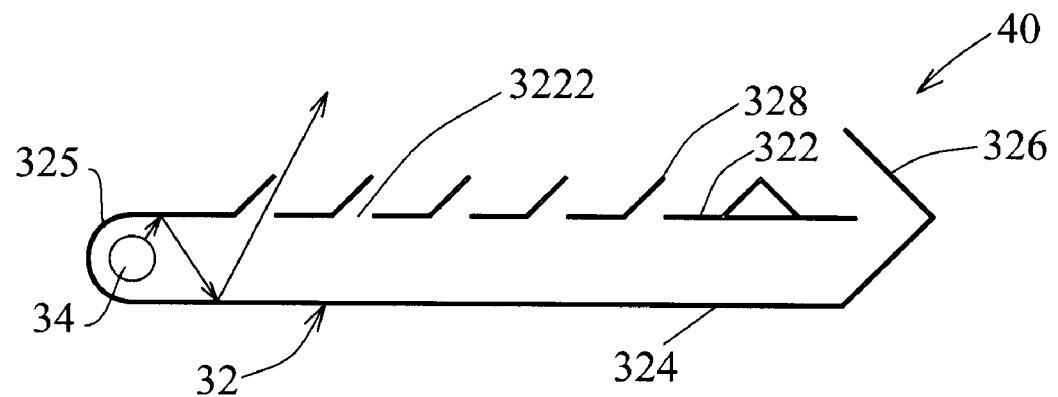
FIG. 3, FIG. 4 and FIG. 5 are the side-view schematic diagrams for the structures of the planar illuminators according to the embodiments of the present invention.

In one embodiment, please continue to refer FIG. 3, the light source frame 40 further includes a plurality of tilted plates 328 arranged on the top plate 322 to increase the number of reflections for the light before it illuminates onto the image panel (not shown in the figure), and each of the tilted plates 328 is connected with an edge of the slits 3222.

Figure 4:
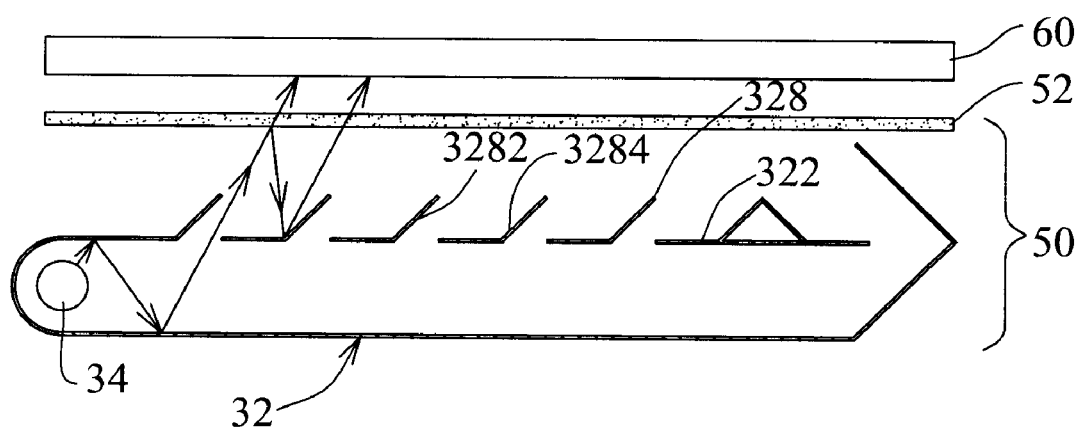

In one embodiment, please refer to FIG. 4, the planar illuminator 50 further includes at least one optical film 52 arranged in front of the light source frame 32 to increase the uniformity and the quality for the light before it illuminates onto the image panel 60. The optical film 52 may be a diffusive film, an optical film with microstructure or a reflective polarizer. Additionally, both of the inner surface 3282 and the outer surface 3284 of the tilted plates 328 may have a reflective coating to increase the reflectivity.

Figure 5:
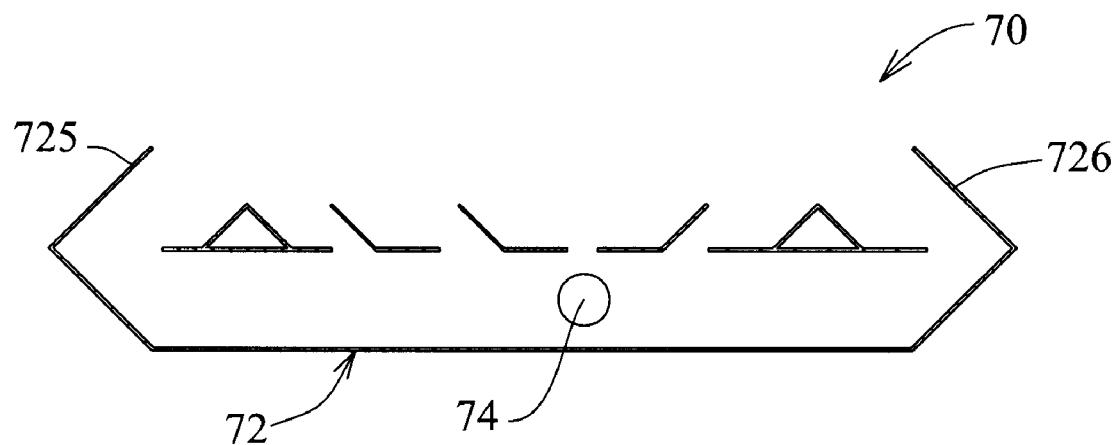

The design of the light source frame 32 is very flexible, please refer to FIG. 2A, the top end of the edge plate 325 is connected with the top plate 322, and the light source 34 is arranged near the edge plate 325. Further, the shape of the edge plate 325 is curved. In FIG. 2A, the top end of the edge plate 326 is open-ended and the edge plate 326 is bended in an angle. In another embodiment, please refer to FIG. 5, which is a side-view schematic diagram for the structure of the planar illuminator 70, both of the top ends of the edge plates 725, 726 are open-ended, and both of the edge plates 725, 726 are bended in an angle. Further, the light source 74 is arranged near the middle of the cavity of the light source frame 72.

According to the above description, one feature of the present invention is that the light source frame may further arrange tilted plates and reflective coatings to increase the number of reflections and the reflectivity, or may include optical films to increase the uniformity and brightness before the light illuminates onto the image panel. Therefore, the uniformity and the quality of the illumination light output from the planar illuminator according to the present invention are effectively promoted.

Figure 6:
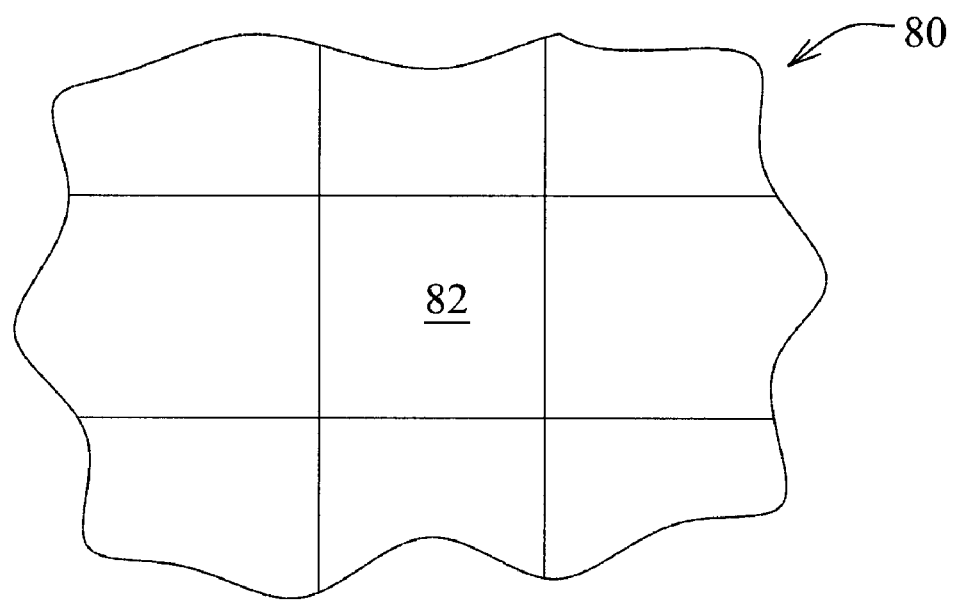
FIG. 6 is a top-view schematic diagram for the structure of a large-area backlight module according to one embodiment of the present invention.

According to the above description, another feature of the present invention is that the weight of the planar illuminator according to the present invention is light, so it is suitable to be tiled up to form a large-area backlight module for a large size display. In one embodiment, please refer to FIG. 6, a plurality of discrete planar illuminator 82 is tiled up to form a large-area backlight module 80. The structure of the discrete planar illuminator 82 is similar to which of the planar illuminator described in the aforementioned embodiments, it is not to further describe herein.

To summarize, the present invention provides a planar illuminator with a light source frame having a hollow reflective cavity. There are several advantages of the planar illuminator according to the present invention, which includes: 1. the required uniformity and brightness of the planar illuminator are achieved; 2. its weight is largely reduced; and 3. it can be tiled up to form a large-area backlight module for a large size display.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the Claims appended hereto and their equivalents.

What is claimed is:

1. A structure of a planar illuminator, comprising:
at least a light source frame, comprising:
a top plate having a plurality of slits and a plurality of tilted plates, wherein the tilted plates are arranged on the top plate, and the tilted plates are connected to an edge of the slits;
a bottom plate arranged apart from the top plate; and
at least two edge plates arranged opposite to each other, wherein each of the edge plates has a top end and a bottom end, and both of the bottom ends are separately connected to the bottom plate;
wherein inner surfaces of the top plate, the bottom plate and the edge plates form a reflective cavity of the light source frame;
wherein at least one top end of the two edge plates is open-ended and is bent at an angle; and
at least one light source arranged in the light source frame;
wherein the light source emits light which impinges on an inner surfaces of the light source frame and then the light is repeatedly reflected within the reflective cavity to propagate the light down the light source frame;
wherein a portion of the light pass out of the light source frame via the slits.

2. The structure of the planar illuminator according to claim 1, wherein the planar illuminator is a backlight module for an image panel.

3. The structure of the planar illuminator according to claim 1, wherein at least one top end of the two edge plates is connected to the top plate.

4. The structure of the planar illuminator according to claim 3, wherein at least one light source is arranged proximate to the edge plate whose top end is connected to the top plate.

5. The structure of the planar illuminator according to claim 3, wherein a shape of the edge plate whose top end connected to the top plate is curved.

6. The structure of the planar illuminator according to claim 1, wherein the inner surface of the reflective cavity has a reflective coating.

7. The structure of the planar illuminator according to claim 1, wherein the material of the light source frame is metal.

8. The structure of the planar illuminator according to claim 7, wherein the light source frame is a one-piece structure and is fabricated by using a sheet metal fabrication method, a pressing and stamping method or a punching and bending method.

9. The structure of the planar illuminator according to claim 1, wherein the material of the light source frame is plastic or acrylic.

10. The structure of the planar illuminator according to claim 9, wherein the light source frame is a one-piece structure and is fabricated by using an injection molding process.

11. The structure of the planar illuminator according to claim 1, wherein an inner surface of the reflective cavity, an inner surface and an outer surface of the tilted plates have a reflective coating.

12. The structure of the planar illuminator according to claim 1, wherein a material of the light source frame is metal, and the light source frame is fabricated by using a sheet metal fabrication method, a pressing and stamping method or a punching and bending method.

13. The structure of the planar illuminator according to claim 1, wherein a material of the light source frame is plastic or acrylic, and the light source frame is formed by using an injection molding process.

14. The structure of the planar illuminator according to claim 1, wherein the light source is Cold Cathode Fluorescent Lamp (CCFL), Light Emitting Diode (LED) or Laser Diode (LD).

15. The structure of the planar illuminator according to claim 1 further comprising at least one optical film arranged in front of the light source frame.

16. The structure of the planar illuminator according to claim 15, wherein the optical film is a diffusive film, an optical film with microstructure or a reflective polarizer.

* * * * *